United States Patent
Hugonie et al.

(10) Patent No.: US 7,360,986 B2
(45) Date of Patent: Apr. 22, 2008

(54) SYSTEM FOR BLOCKING A MAIN SHAFT OF AN ENGINE HAVING A FUSIBLE BEARING

(75) Inventors: Aymeric Hugonie, Cheptainville (FR); Claude Mons, Savigny le Temple (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 569 days.

(21) Appl. No.: 11/100,493

(22) Filed: Apr. 7, 2005

(65) Prior Publication Data
US 2005/0232755 A1    Oct. 20, 2005

(30) Foreign Application Priority Data
Apr. 14, 2004  (FR) .................................. 04 03910

(51) Int. Cl.
*F01D 21/00* (2006.01)
(52) U.S. Cl. .................... 415/9; 415/174.1; 415/216.1; 416/244 A
(58) Field of Classification Search .................. 415/9, 415/174.1, 216.1, 217.1, 229; 416/244 A
See application file for complete search history.

(56) References Cited

U.S. PATENT DOCUMENTS 3,880,479 A * 4/1975 De Feo et al. .............. 384/129
6,079,200 A * 6/2000 Tubbs ............................ 415/9
6,135,712 A * 10/2000 Chevrollier et al. ...... 415/216.1
6,491,497 B1 * 12/2002 Allmon et al. .............. 416/174

FOREIGN PATENT DOCUMENTS

EP    1 126 137 A2    8/2001
FR    2 773 586       7/1999

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A turbomachine including at least a first rotary assembly with a first shaft, a stator, and bearings secured to the stator and suitable for supporting the first shaft, one of the bearings being capable of giving way when an unbalance occurs in the first rotary assembly. The turbomachine further comprising brake arrangement for braking the first shaft when the unbalance occurs, and bond arrangement acting at the end of braking to bond a portion of the first shaft to a surrounding portion of the turbomachine. The turbomachine is intended to be used mainly in the field of aviation, and more particularly as an airplane turbojet.

13 Claims, 3 Drawing Sheets

SYSTEM FOR BLOCKING A MAIN SHAFT OF AN ENGINE HAVING A FUSIBLE BEARING

FIELD OF THE INVENTION

The invention relates to a turbomachine which comprises at least a first rotary assembly with a first shaft, a stator, and a "fusible" bearing secured to the stator and suitable for supporting said shaft and being capable of giving way when an unbalance occurs in the first rotary assembly. The turbomachine is intended to be used mainly in the field of aviation, and more particularly as an aeroengine.

BACKGROUND OF THE INVENTION

An example of this type of turbomachine is shown in FIG. 1 which shows an airplane turbojet 1 of well known type. The turbojet 1 comprises first and second rotary assemblies 10, 9 surrounded by a stator 2, and separated from said stator by a main flow path 3 of annular section. The main flow path 3 is occupied by stages of blades secured alternately to said rotary assemblies 9 and 10 and to the stator 2 so as to accelerate and compress the gas in order to benefit from the energy that it releases while expanding, after combustion of the fuel. Going from the front to the rear, there are to be found: the blades of a low-pressure compressor 4, the blades of a high-pressure compressor 5, a combustion chamber 6, the blades of a high-pressure turbine 7, and the blades of a low-pressure turbine 8. The first rotary assembly 10 comprises the rotor of the low-pressure compressor 4, the rotor of the low-pressure turbine 8, and a first shaft 12 providing the connection between the two above-mentioned rotors, and also referred to as a "low-pressure" shaft or a main shaft. The second rotary assembly 9 comprises the rotor of the high-pressure compressor 5, the rotor of the high-pressure turbine 7, and a second shaft 11 providing the connection between the two above-mentioned rotors 5 and 7, and also referred to as a "high-pressure" shaft. Since the turbojet 1 comprises two rotary assemblies or spools 9 and 10, it is generally referred to as a twin-spool turbojet.

The first and second shafts 12 and 11 are coaxial and rotate at different speeds, the speed of rotation of the first shaft 12 being less than the speed of rotation of the second shaft 11. Both shafts are supported by means of bearings connected to the stator 2. Going from the front to the rear, there are to be found: a front bearing 13 for the first shaft 12, a front bearing 14 for the second shaft 11, a rear bearing 15 for the second shaft 11, and a rear bearing 16 for the first shaft 12. As their active elements, the bearings comprise one or two ball- or roller-bearings that enable the shafts 11 and 12 to rotate at high speed, independently from each other. The shafts 11 and 12 are completely separate from each other, but over a rather long proximity zone 17 situated substantially in the vicinity of the front bearing 14 of the second shaft 11, the shafts are separated by only a small amount of clearance.

Modern airplane turbojets have a high compression ratio and a high by-pass ratio. They are thus provided with an auxiliary flow path 18 surrounding the main flow path 3, with air traveling along said auxiliary flow path and being mixed with the combustion gas at the rear of the low-pressure turbine 8 (such turbojets are called turbofans). The air traveling along the auxiliary flow path 18 is accelerated by the blades of a fan 19 that is secured to the first rotary assembly 10 and that extends in front of the low-pressure compressor 4. The blades of the fan 19 have a very large diameter and considerable inertia. They are also subject to rupture when the airplane is in flight and when a foreign body, such as a bird, hits said blades.

As soon as a fan blade is ruptured, a significant unbalance occurs in the first rotary assembly 10, thereby producing significant vibration forces thereon, which forces are transmitted to the second rotary assembly 9 and to the stator 2 via the front bearing 13. The damage resulting from such excessive forces is capable of propagating throughout the turbojet 1. For this reason, it is known to use a "fusible" front bearing 13, i.e. a bearing that is capable of being broken or of giving way in some other way when an unbalance occurs in the first rotary assembly 10.

That type of bearing 13 generally includes a break starter in the vicinity of the first shaft 12, which starter is generally a thin portion connecting it to the stator 2, or small-diameter connection bolts having threaded shanks that may be notched; an example of that type of bearing is described in U.S. Pat. No. 5,417,501. The break starter is designed so as to tear or to rupture when the unbalance occurs, so that the front bearing 13 becomes detached from the stator 2 and ceases to support the first shaft 12, which then becomes free to oscillate by tilting about the rear bearing 16, thereby no longer imparting excessive force on the stator 2.

Faced with such a problem, the pilot shuts down the corresponding turbojet (i.e. cuts the fuel supply to said turbojet), thereby no longer driving the shafts 11 and 12 in rotation so that their speed of rotation decreases. The pilot then seeks to land on the closest landing site, the airplane remaining in flight until landing as a result of its other undamaged turbojet(s). During this stage of flight, while the second shaft 11 progressively stops turning, the fan 19 driven by the air which passes therethrough continues to turn slowly (relative to its normal speed of rotation) and drives the first shaft 12 in rotation; the first rotary assembly 10 and the shaft 12 are said to be windmilling.

Unfortunately, such windmilling creates vibrations which propagate throughout the airplane in a manner that is noticeable to the passengers. It should be observed that the amplitude of such vibration increases as the windmilling frequency approaches the resonant frequency of the fan.

To avoid that drawback, a known solution, described in document EP 1 126 137 A2, consists in fitting each turbojet with a brake system constituted by a brake drum secured to the rotor of the low-pressure compressor, and by a cylindrical support secured to the stator on which a plurality of brake friction pads are mounted. The pads are capable of passing from a first position, in which they do not touch the drum, to a second position in which they rub against the drum so as to brake it, or even prevent it from turning, depending on the level of friction.

That known brake system nevertheless presents the drawback of being made up of numerous parts (bolts, pads, . . . ), thereby making it complex and expensive to manufacture, and difficult to install. In addition, because of the space that such a system occupies, it can be installed only at the front of the turbojet, under the blades of the low-pressure compressor.

OBJECT AND SUMMARY OF THE INVENTION

The present invention seeks to eliminate the vibrations caused by the fan windmilling by using a system that is effective and of simple structure.

To achieve this object, the invention provides a turbomachine comprising at least a first rotary assembly with a first shaft, a stator, and bearings secured to the stator and suitable for supporting the first shaft, one of said bearings being capable of giving way when an unbalance occurs in the first rotary assembly, the turbomachine further comprising brake means for braking the first shaft when the unbalance occurs, and bond means for acting at the end of braking to bond a portion of the first shaft to a surrounding portion of the turbomachine, with which the portion of the first shaft is capable of coming into contact when said unbalance occurs.

As a result of bonding together said portions, the first shaft is blocked better than when using systems of the above-described type in which blocking of the first shaft depends on the level of friction exerted by the pads on the drum. When said friction is insufficient, the first shaft is braked, but is not blocked, such that a vibration phenomenon can remain.

In advantageous manner, said bond means comprise a ring situated between said portion of the first shaft and said surrounding portion of the turbomachine, and said ring is secured to one of said two portions and comprises a fusible composition capable of becoming heated by friction with the shaft portion or the surrounding portion, and of melting as a result of said heating.

Advantageously, said fusible composition mainly comprises aluminum, said element having a melting point that is sufficiently low and that enables good bonding to be obtained.

Furthermore, in a particular embodiment of the invention, the ring is obtained by thermal spraying. Thermal spraying is a technique that is very appropriate in the present case since said ring is easy to make and adheres well to the substrate on which it is deposited, i.e. said portion of the first shaft or said surrounding portion. Furthermore, this technique can be used regardless of the shape of the substrate (cylindrical, frustoconical, . . . ).

In order to make it easier to heat the fusible composition, the surface of said portion of the first shaft, when the ring is mounted on said surrounding portion, or the surrounding portion of the turbomachine, when the ring is mounted on the portion of the first shaft, is advantageously uneven.

In this case, the friction zone is limited to the interface between the tops of the bumps of said surface and said ring. Since the area of said friction zone is limited, its temperature increases very quickly, thereby accelerating the melting of said composition. It should be observed that the contact between said surface and said ring is generally a planetary contact.

It should be observed that the turbomachine of the invention can have one or more rotary assemblies. When the turbomachine has a single rotary assembly, the bond means are disposed between a portion of the first shaft and a surrounding portion belonging to the stator of the turbomachine, so that said portion of the first shaft is capable of being bonded to the stator. However, when the turbomachine has a plurality of rotary assemblies, said surrounding portion can belong to the stator or to one of the other rotary assemblies (other than the first assembly).

The turbomachine is advantageously an aeroengine and more particularly a turbojet. It should be understood that the turbojet can be a single-spool, twin-spool, or three-spool turbojet. In the particular case of a twin-spool turbojet, similar to the turbojet shown in FIG. 1, the turbomachine has a second rotary assembly with a second shaft, the first and the second shafts being coaxial and capable of rotating at different speeds, the first shaft rotating more slowly than the second. In this type of turbomachine, said surrounding portion preferably belongs to the second shaft.

The turbomachine of the invention also includes brake means for braking the first shaft sufficiently before the fusible composition melts, thereby enabling the fusible composition to solidify so as to form the desired bond. In the absence of such brake means, the fusible composition would melt and the excessively fast rotation of the first shaft would disperse the melted composition inside the turbomachine.

As a general rule, it should be observed that following the occurrence of the unbalance and the rupture of the fusible bearing, the blades of the low-pressure compressor come into contact with the stator, thereby creating friction which assists in braking the first shaft.

Advantageously, said brake means comprise a covering covering a segment of the first shaft, the covering being capable of coming to rub against an adjacent zone of the turbomachine when said unbalance occurs. Said adjacent zone can appear at the stator of the turbomachine or at a rotary assembly that is different from the first assembly in the case of a twin-spool or three-spool turbojet.

At the same time as braking the segment of the first shaft, the covering enables the segment to be protected from any direct contact with the adjacent zone of the turbojet.

In a particular embodiment of said covering, said covering comprises a layer of fibers impregnated with resin. The covering is thus simple to make and easy to put into place.

Advantageously, resins are selected that present low thermal conductivity, that withstand temperature well, and that present good mechanical properties, such as epoxy resins, bismaleimide resins, and phenolic resins. The ability of the resin to withstand temperature must be selected in particular as a function of the normal operating conditions of the first shaft, i.e. when not in any contact: when the operating temperature of the shaft does not exceed 120° C., epoxy resins can be used, while at higher temperatures bismaleimide resins and particularly phenolic resins are preferred.

The layer of fibers makes it possible to reinforce the mechanical strength of the covering when it comes into contact with the adjacent zone of the turbomachine. The layer is either pre-impregnated with resin and then wound around the first shaft, or it is firstly wound therearound and is then impregnated with resin. Said layer can be wound around the shaft several times in such a manner as to adjust the thickness of the covering and/or to reinforce its mechanical strength.

In a particular embodiment of the covering, the layer of fibers is formed by a sleeve of fibers capable of being slid onto the first shaft. This particular shape and capability make it easier to put said layer into place. In order to adjust the thickness of the covering and/or to reinforce its mechanical strength, it is advantageously possible to slide a plurality of sleeves onto the first shaft and to superpose them.

BRIEF DESCRIPTION OF THE DRAWINGS

The invention will be better understood and its advantages will appear clearly on reading the following detailed description of an embodiment of the invention shown by way of non-limiting example. The description refers to the accompanying drawings, in which.

MORE DETAILED DESCRIPTION

Figure 1:
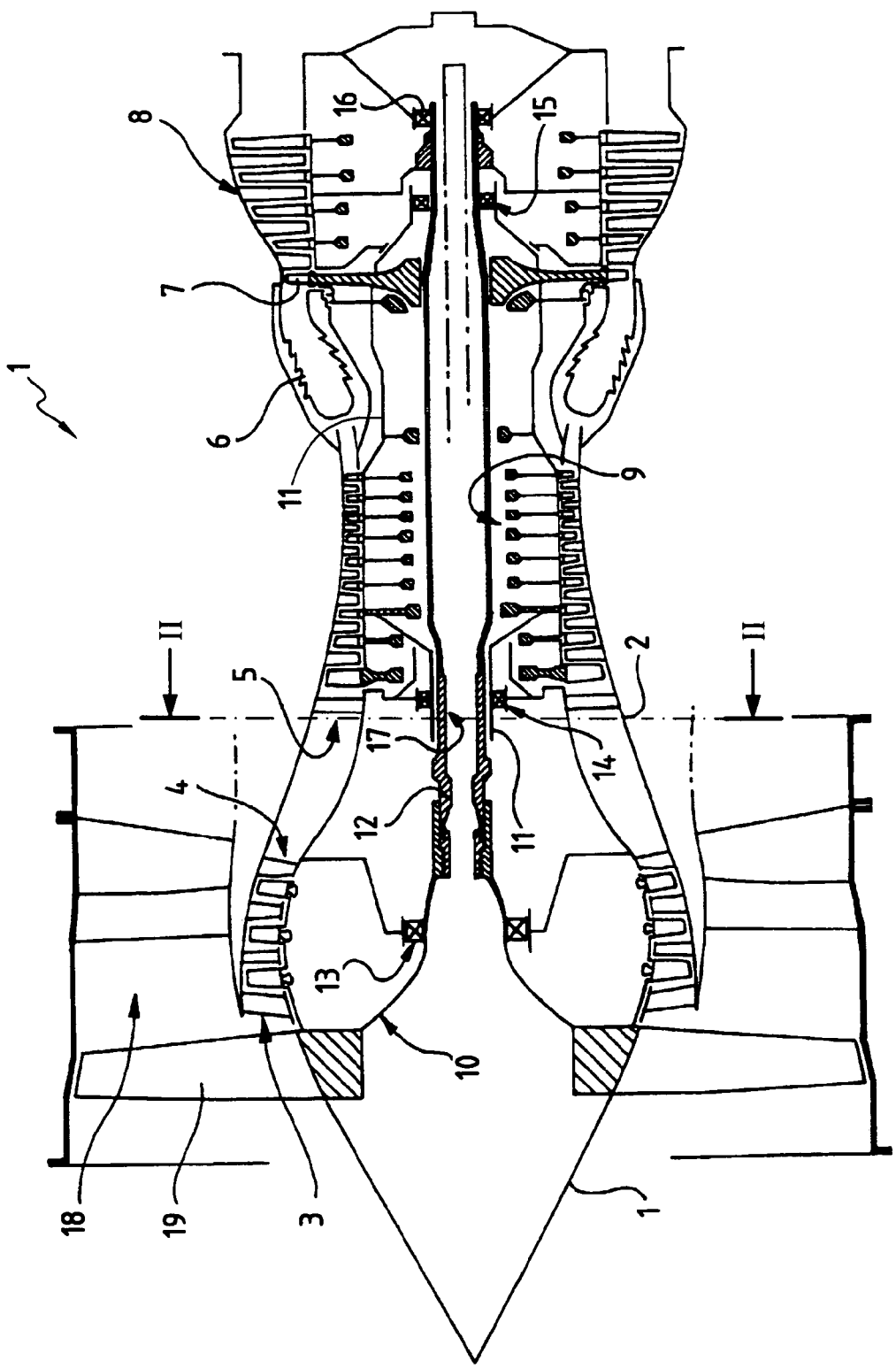
FIG. 1 is a section view of an airplane turbojet of known type.
Figure 2:
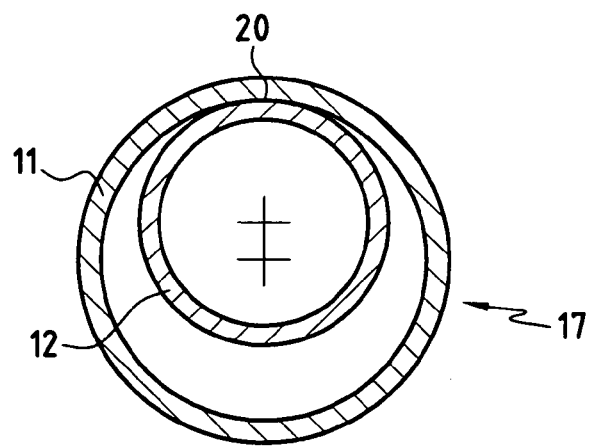
FIG. 2 is a section view on plane II-II of FIG. 1 showing two shafts of the FIG. 1 turbojet when the first shaft is free to oscillate.

Above-described FIG. 1 shows a twin-spool airplane turbofan of well known type. The proximity zone 17 can be seen in which the first shaft 12 and the second shaft 11 are very close. It is in said zone that the two shafts 12 and 11 come into contact with each other when the fusible bearing 13 gives way following the rupture of a blade of the fan 19, as shown in FIG. 2. Once the fusible bearing 13 has given way, the first shaft 12 of the turbojet, which is free to oscillate by tilting about the rear bearing 16, rubs against the second shaft 11 in the contact zone 20.

Figure 3:
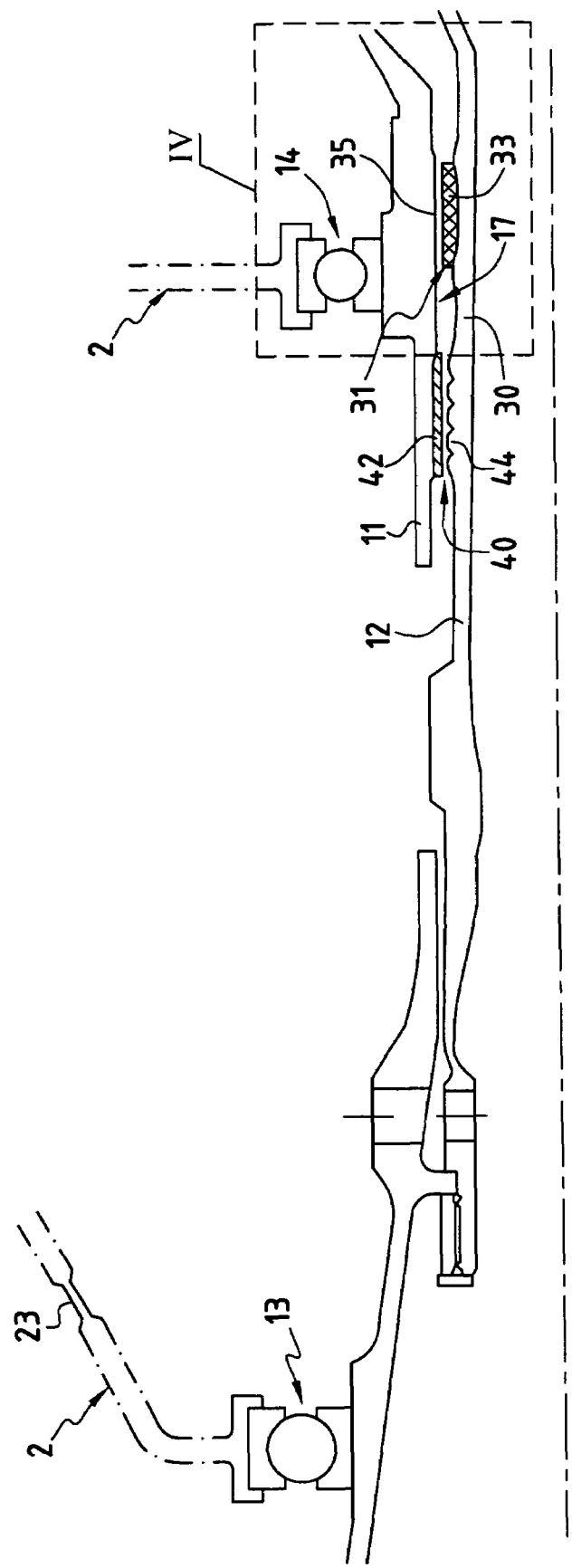
FIG. 3 is a diagrammatic section view showing a portion of a turbomachine of the invention on which brake means and bond means of the invention are shown.

The turbomachine of the invention shown in part in FIG. 3 is a twin-spool airplane turbofan similar to the turbofan described above and shown in FIG. 1. For this reason, the same numeric references are used to designate those elements that are common both to the invention and to the prior art.

FIG. 3 shows only the portion of a turbomachine that is situated in the vicinity of the proximity zone 17. In this figure, it can be seen that the "low-pressure" first shaft 12 is retained by a fusible front bearing 13 secured to the stator 2 and capable of being ruptured at its zones of weakness 23. The second shaft 11 is situated around the first shaft 12 (the shafts are coaxial) and is retained by the front bearing 14 secured to the stator 2. The shafts are particularly close to each other in the proximity zone 17. The segment 30 of the first shaft 12 situated in said zone 17 is surrounded on all sides by portions of the first shaft which present outside diameters that are greater than the diameter of said segment 30.

As shown in FIG. 3, the segment 30 is covered by brake means 31 and by bond means 40 of the invention. The means 31, 40 are spaced apart, and the brake means are situated behind the bond means (front and rear being defined by the air-flow direction, with air entering through the front and leaving from the rear of the turbomachine).

Figure 4:
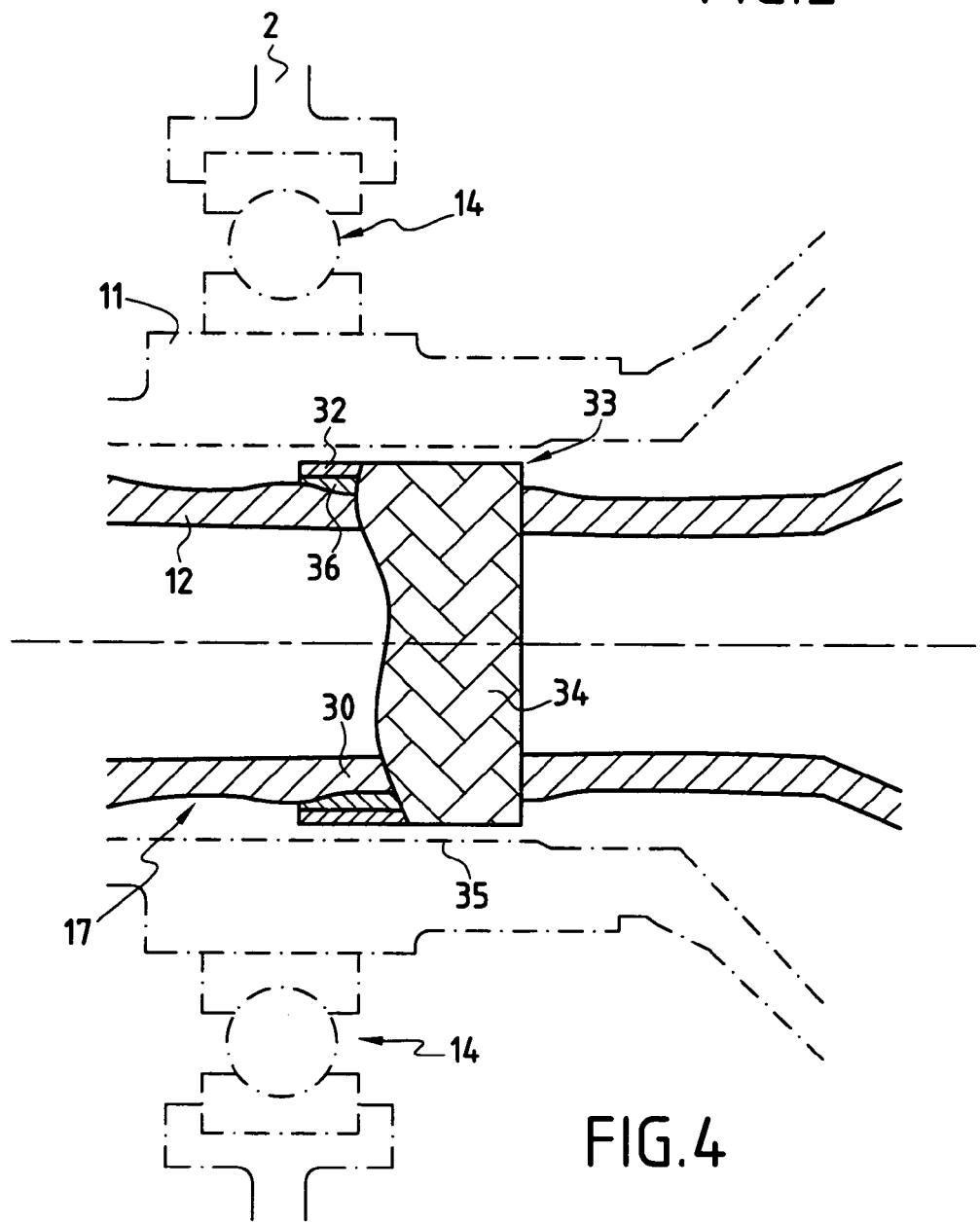
FIG. 4 is a larger-scale view of zone IV in FIG. III, on which the brake means are shown by chain-dotted lines.

As shown in the FIG. 4 embodiment, the brake means 31 comprise a composite covering 33 comprising a sleeve 32 of braided fibers 34 oriented in such a manner as to reinforce the mechanical strength of the covering, and impregnated with phenolic resin. The resin can contain dry lubricants such as graphite, molybdenum disulphide, boron nitride, or any other known dry lubricant. The fibers 34 are in fact strands of carbon, aramid, or glass fiber, and they are braided in such a manner as to provide the sleeve 32 with a certain amount of deformability for the purpose of making it easier to put said sleeve into place. Thus, when the sleeve 32 is slid onto the shaft 12, it is stretched radially so as to increase its diameter and pass over portions of the shaft having a diameter that is greater than the diameter of the segment 30, thereby enabling the sleeve to be positioned easily on the segment 30. Once positioned correctly, the sleeve 32 is stretched axially so as to reduce its diameter and so as to press it around said segment 30. To make it easier to put into place, the sleeve 32 can present a certain amount of elasticity which enables it to tighten around said segment. This elasticity can be obtained by the braiding of the fibers 34 and the fiber ratio that is used. Once the sleeve 32 has been put into place on the shaft 12, it is impregnated with resin.

The composite covering 33 seeks to brake the first shaft 12, while protecting it from direct contact with the adjacent zone 35 of the turbojet, formed in this case by a segment of the second shaft 11, and situated facing said covering 33.

Advantageously, the coefficient of friction between the phenolic resin, used for the covering 33, and the adjacent zone 35 of the turbojet, is sufficiently small to limit the temperature rise of the first shaft 12 and to prevent said shaft from becoming fragile. It has been observed that it advisable to limit the temperature rise linked to friction between the covering 33 and said adjacent zone 35, since high temperatures spoil the mechanical properties of the first shaft 12, in particular its breaking strength and its resistance to fatigue. As a general rule, when the second shaft 11 is made of titanium alloy, said coefficient of friction lies in the range 0.1 to 0.6. For example, the coefficient of friction when rubbing against a phenolic resin is about 0.3.

Advantageously, the brake means 31 also comprise an first intermediate layer 36 made of a material that is different from the covering 33 and that is disposed between the woven/resin composite covering and the first shaft 12. The intermediate layer 36 is made of graphite, for example. The coefficient of friction between the intermediate layer 36 and the second shaft 11 is greater than the coefficient of friction between the covering 33 and the shaft 11, thereby braking the first shaft 12 more significantly.

Wear on the covering 33 increases or decreases as a function of the materials used, the difference between the speeds of rotation of the first and second shafts, and the temperature in the zone 17. The mechanical strength and the thickness of the covering 33 are selected so that contact between the first intermediate layer 36 and the second shaft 11 is established when the speed of rotation of the first shaft 12 has reduced sufficiently so as to limit the temperature rise linked to friction.

In a particular embodiment of the invention, a second intermediate layer (not shown) can be disposed between the first intermediate layer 36 and the first shaft 12. This layer seeks to prevent a galvanic-corrosion phenomenon from becoming established between the shaft 12 made of maraging steel or of high-strength steel, for example, and the first layer 36. Advantageously, said layer is a layer of epoxyphenolic paint or a paint having aluminum pigment.

The bond means 40 themselves comprise an aluminum ring 42 secured to a surrounding portion of the turbomachine, in the case the second shaft 11. The ring is deposited on the second shaft 11 by thermal spraying.

In addition, ribs are formed on the portion 44 of the first shaft 12 situated facing the ring 42. The ribs extend parallel to the first shaft 12 or are tangentially inclined relative thereto so as to increase contact surface areas taking account of the relative displacements between the first shaft 12 and the ring 42.

When a blade of the fan of the turbomachine of the invention breaks, an unbalance occurs in the rotary assembly 10 and the "fusible" bearings 13 give way. The first shaft 12 thus oscillates about the rear bearing 16 and becomes off-centered so that the brake means 31 come to rub against the adjacent zone 35 of the second shaft 11. The brake means become worn as they slow down the first shaft 12. The thickness of the brake means 31 and the distance between the means 31 and the bond means 40 are selected so that once the speed of rotation of the first shaft 12 has reduced sufficiently, the ring 42 comes to rub against the ribs of the portion 44 of the first shaft 12 and becomes heated. This heating causes the ring 42 to melt, thereby enabling the first and second shafts 11 and 12 to become bonded together.

In another embodiment of the invention (not shown), the brake means 31 and the bond means 40 are secured to the first shaft 12, the brake means 31 being superposed with the bond means 40 on the same segment of the first shaft 12.

Naturally, it is also possible for the brake means 31 and the bond means 40 to be secured to the second shaft 11 and superposed. In all cases, the brake means 31 cover the bond means 40. Thus, the bond means 40 are situated between the brake means and the shaft under consideration, so as to come into contact with the other shaft only once the brake means 31 are worn.

What is claimed is:

1. A turbomachine comprising at least a first rotary assembly with a first shaft, a stator, and bearings secured to the stator and suitable for supporting the first shaft, one of said bearings being capable of giving way when an unbalance occurs in the first rotary assembly, the turbomachine further comprising brake means for braking the first shaft when the unbalance occurs, and bond means acting at the end of braking to bond a portion of the first shaft to a surrounding portion of the turbomachine.

2. A turbomachine according to claim 1, wherein said bond means comprise a ring situated between said portion of the first shaft and said surrounding portion of the turbomachine, and wherein said ring is secured to one of said two portions and comprises a fusible composition capable of becoming heated by friction with the shaft portion or the surrounding portion, and of melting.

3. A turbomachine according to claim 1, wherein the surface of said portion of the first shaft and of said surrounding portion of the turbomachine is uneven.

4. A turbomachine according to claim 1, further comprising a second rotary assembly with a second shaft, the first and the second shafts being coaxial and capable of rotating at different speeds, said surrounding portion of the turbomachine belonging to the second shaft so that said portion of the first shaft is capable of being bonded to the second shaft.

5. A turbomachine according to claim 1, wherein said surrounding portion of the turbomachine belongs to the stator so that said portion of the first shaft is capable of being bonded to the stator.

6. A turbomachine according to claim 2, wherein said fusible composition mainly comprises aluminum.

7. A turbomachine according to claim 2, wherein said ring is obtained by thermal spraying.

8. A turbomachine according to claim 1, wherein the brake means comprise a covering covering a segment of the first shaft, the covering being capable of coming to rub against an adjacent zone of the turbomachine when said unbalance occurs.

9. A turbomachine according to claim 8, wherein said covering comprises a layer of fibers impregnated with resin.

10. A turbomachine according to claim 9, wherein said covering comprises fibers selected from the following reinforcement fibers: carbon fibers, aramid fibers, and glass fibers; and a resin selected from the following resins: epoxy resin, bismaleimide resin, and phenolic resin.

11. A turbomachine according to claim 1, wherein the brake means and the bond means are spaced apart, the brake means being situated behind the bond means.

12. A turbomachine according to claim 1, wherein the brake means and the bond means are superposed on each other, the brake means covering the bond means.

13. A turbomachine according to claim 1, wherein the turbomachine is an airplane turbojet.

* * * * *